S. R. Owen,
Churn.
No. 85,026.  Patented Dec. 15, 1868.
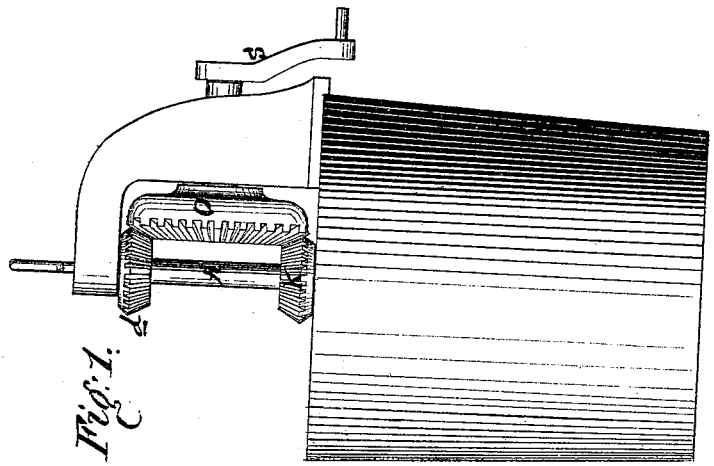
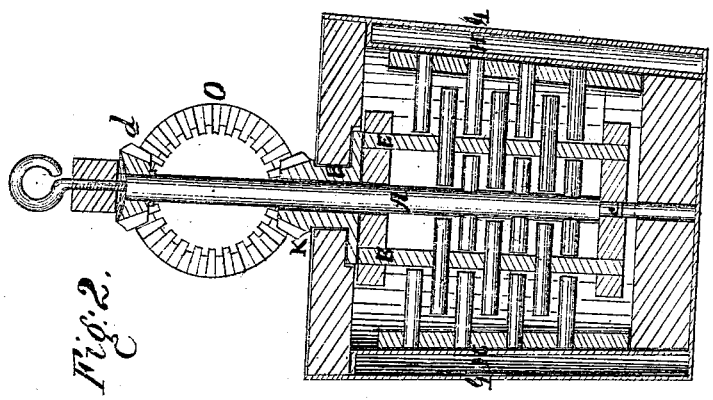
Witnesses
J. C. Smith
A. Heyburn
Inventor
S. R. Owen
Chipman, Hosmer & Co.
Attys

S. R. OWEN, OF STEWARTSVILLE, MISSOURI.

Letters Patent No. 85,026, dated December 15, 1868.

IMPROVEMENT IN CHURNS.

The Schedule referred to in these Letters Patent and making part of the same.

*To all whom it may concern:*

Be it known that I, S. R. OWEN, of Stewartsville, in the county of De Kalb, and State of Missouri, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of an external view of my churn, and Figure 2 is a sectional view thereof.

The object of my invention is to provide more efficient means than have heretofore been devised for extracting butter from cream and milk.

Butter is a fatty substance enclosed in small capsules in cream or milk, and the results secured by the process called churning, are to break the caps and gather the butter thus released into compact masses.

It follows, therefore, that to produce perfect and expeditious work in churning, the entire amount of the cream or milk in the churn should receive the same amount of agitation at the same time, and if any portion of it receives fewer blows than the rest, there cannot be a simultaneous release of butter from all the capsules, and there is danger that some portions thereof may never be broken in the process.

My device is intended to secure the result above named.

The letter A, of the drawings, represents an upright wooden shaft, passing from the bottom of the churn, to a point about a foot, more or less, above the top thereof.

The lower end of shaft A sits and rotates on a wooden pivot in the bottom of the churn, marked $c$.

Letter $d$ is a small pinion attached firmly to the top of shaft A, as shown.

Letter B is a sleeve, adjusted to shaft A at the point represented, and circles around the same, as hereinafter mentioned.

At the lower side or end of this sleeve, I connect therewith a frame, consisting of two side and one bottom bar, as shown, which said frame is marked E.

The letters G are sockets, affixed to the sides of the churn at the points represented, and which serve as holders for the racks H next mentioned.

The racks H consist each in a wooden bar, placed in sockets G, so as to be easily removable, and they have respectively a series of pins firmly attached thereto, extending inward, as shown. Similar pins are placed through the side pieces of frame E, and also through the shaft A. These pins are adjusted and arranged in the rack, the frame, and the shaft, in such manner, that those of the frame shall pass between those of the rack and the shaft respectively, when in motion.

The letter K is a cogged wheel or pinion, attached firmly to the sleeve B above the churn-lid; and Letter O is a large cogged wheel, adjusted to mesh and work in pinions $d$ and K, in the manner shown; and Letter S is the crank and shaft attached thereto.

My device is operated by turning the crank S. The large cog-wheel working with pinion K, turns the sleeve B, and, at the same time, the same wheel working in pinion $d$, rotates the shaft A in the opposite direction.

The effect of these devices, thus operated, is to cause a simultaneous movement of all the fluid in the churn, and, by the extraordinary agitation created, to break the caps that hold the butter, with great rapidity and success.

What I claim as my invention, and desire to secure by Letters Patent, is—

The shaft A, sleeve B, and frame E, with their respective arms or beaters, herein described and shown, in combination with the racks H and sockets G, when constructed and operating substantially as herein specified.

In testimony that I claim the above, I have hereunto subscribed my name, in the presence of two witnesses.

S. R. OWEN.

Witnesses:
J. P. SCOTT,
ALFRED CHIFFS.